United States Patent [19]

Jansen

[11] 4,264,848
[45] Apr. 28, 1981

[54] DEVICE FOR THE MONITORED CONTROL OF A STEPPING MOTOR

[75] Inventor: Dirk Jansen, Neuhausen, Fed. Rep. of Germany

[73] Assignee: Institut fur Flugnavigation der Universitat Stuttgart, Stuttgart, Fed. Rep. of Germany

[21] Appl. No.: 920,184

[22] Filed: Jun. 29, 1978

[30] Foreign Application Priority Data

Feb. 9, 1978 [DE] Fed. Rep. of Germany ....... 2805363

[51] Int. Cl.³ ............................................. G05B 23/02
[52] U.S. Cl. ...................................... 318/565; 318/685
[58] Field of Search ......................... 318/565, 685, 696

[56] References Cited

U.S. PATENT DOCUMENTS

| 3,359,474 | 12/1967 | Welch et al. | 318/696 |
| 3,624,479 | 11/1971 | Callas | 318/565 |
| 3,896,363 | 7/1975 | Kinsel et al. | 318/685 |
| 4,034,277 | 7/1977 | Leenhouts | 318/685 |
| 4,103,632 | 8/1978 | Bowles | 318/685 |

Primary Examiner—J. V. Truhe
Assistant Examiner—Eugene S. Indyk
Attorney, Agent, or Firm—Darbo & Vandenburgh

[57] ABSTRACT

A stepping motor turns 45° for each step in response to a digital control signal different than the signals for other step adjacent thereto. An angle sensor produces a digital position indicating signal for sectors centered about the step positions and of the same magnitude as the angle between motor steps. The position indicating signal for a sector corresponds to the digital signal of the motor step that falls within that sector. An evaluation circuit comprising a microprocessor produces an error signal when, after a predetermined elapsed time after receipt of a control signal, a corresponding position indicating signal is not received. The evaluation circuit also checks for correspondence of signal within a minimum time after receipt of a control signal, and failing to find such correspondence assumes that the motor has not performed the directed step.

8 Claims, 6 Drawing Figures

DEVICE FOR THE MONITORED CONTROL OF A STEPPING MOTOR

BACKGROUND AND SUMMARY OF THE INVENTION

The invention relates to a device for the monitored control of a stepping motor, comprising a control device for generating digital control signals for the stepping motor, each digital signal being associated with one or more discrete, stable positions of the stepping motor and generating an energization pattern of the stepping motor windings corresponding to this position, and an angle sensor coupled with the stepping motor for generating feedback signals.

Such stepping motor control can be used with the display of the position in a topographic map, wherein a light cross projector is moved along two axes below the map by means of stepping motors, such that the projected light cross points to the position. The number of the steps carried out by the stepping motors is used as a measure of the position of the light cross projector. During operation under rough environmental conditions it may happen that the stepping motor becomes temporarily blocked due to mechanical jamming, variations of friction, contamination or the like, whereby the number of the steps carried out is no longer identical with the number of steps commanded (loss of steps). During operation of the stepping motor with certain stepping frequencies resonances caused by the moment of inertia of the load may occur and thus also involve the risk of a loss of steps. As the indicating range is limited by stops, a device must be provided which switches the motor off upon reaching the stop and causes a corresponding alarm.

In order to avoid blocking of the drive means due to unexpected load variations, stepping motors having ample driving torques are used in prior art devices. Because of the ample dimensioning of the driving torques of the stepping motors commanded steps could be assumed to be carried out. Thereby, however, the dimensions of such an instrument become undesirably large. In practice, it is often necessary to accommodate the map display instrument with the light cross projector and the drive therefor within a small flat housing below the map. In the prior art arrangement the stops are detected by limit switches or similar sensors, which have to be adjusted very accurately, namely, accurately to half-a-step distance.

Furthermore, it is known to couple the stepping motor through a transmission to an angle sensor. The angle sensor permits monitoring of the position of the drive means within the indicating range. The stepping motor is actuated until the desired position has been reached (follow-up principle). Potentiometers, synchros and angular encoders are used as angle sensors. As the position of the drive means is known at any time, stops may be omitted.

In the prior art arrangements the resonance phenomena of the stepping motor are suppressed by mechanical damping (brakes, hydraulic damping) or by avoiding the critical drive frequencies. Mechanical damping elements are very expensive and susceptible to trouble and reduce the reliability of the drive mechanism. The follow-up principle with an angle sensor covering the whole operating travel of the stepping motor through a plurality of revolutions is very complex and expensive in construction.

It is the object of the invention to construct a device of the type defined in the beginning such that small and space-saving stepping motors may be used and a monitoring device constructed with simple means provided to monitor, at any time, whether the commanded steps have been carried out by the stepping motor.

In accordance with the invention this object is achieved in that only one well-defined signal of the angle sensor is associated with each stable position of the stepping motor and that an evaluation circuit adapted to compare the control signal and the angle sensor signal is provided, said circuit being adapted to monitor the carrying-out of each individual commanded step by the stepping motor.

Thus in accordance with the invention the carrying out of each individual step is monitored by an angle sensor which, however, does not represent the whole range of settings but permits only discrimination between the possible electrically determined positions of the stepping motor within one single revolution thereof. Monitoring is effected by comparing the control signal applied to the stepping motor and associated with a certain electric energization pattern of the stepping motor windings to the signal provided by the angle sensor and corresponding to the angular position of the stepping motor. Thus each individual step is monitored. Each command initiating a step of the stepping motor is given a "receipt" by the angle sensor signal. The angle sensor needs not to be able to discriminate between the steps through the whole range of settings of the stepping motor. Thereby the whole setup is considerably simplified.

The angle sensor may be arranged to generate digital output signals each of which is associated with one or more angle ranges, each angle range covering the angle between adjacent positions of the stepping motor.

The number of the electric switching states discernible by the energization patterns of the stepping motor may be equal to the number of the discernible digital output signals of the angle sensor.

The number of the discernible digital output signals of the angle sensor may be equal to the largest submultiple of the number of the stable positions of the stepping motor.

For example, the stepping motor may have eight stable positions which correspond to the angular positions of 0°, 45°, 90°, 135°, 180°, 225°, 270° and 315°. Thus the angle between adjacent stable positions of the stepping motor is 45°, and the angle sensor has eight angle ranges or sectors of 45° with associated output signals. The stepping motor and the angle sensor may be adjusted relative to each other such that each stable position of the stepping motor is in the center of such an angle range. In each one of the angle ranges, the angle sensor supplies a digital output signal, which may be, for example OO within the angle range about the 0° position and in the angle range about the 180° position of the stepping motor, OL within the adjacent angle range about the 45° position of the stepping motor and about the 225° position of the stepping motor, LL within the angle ranges about the 90° position and about the 270° position of the stepping motor, and LO within the angle ranges about the 135° position and about the 315° position of the stepping motor. Thus the angle sensor provides one out of four discernible digital output signals. Correspondingly the stepping motor with its two windings is arranged to be switched into four electric states, discernible by the energization patterns of the stepping motor windings, by means of four different digital control signals, which may also be designated OO, OL, LL and LO, each two diametrically opposite stable positions of the stepping motor being obtained by identical energization patterns of the stepping motor windings. Thus the number of the discernible electric switching states of the stepping motor is equal to the number of the discernible digital output signals of the angle sensor, namely, four, in both instances. The number of the discernible digital output signals of the angle sensor is equal to the largest submultiple, namely, four, of the number of stable positions of the stepping motor, namely, eight.

The evaluation circuit may be arranged to generate an error signal, when after a predetermined maximum time, after the control signal has been applied, the signal from the angle sensor does not yet adopt the value associated with this control signal.

Thus, there is a wait of a given maximum time after the application of the control signal during which the stepping motor has to be set into the angular position corresponding to this control signal. If this is not the case, for example, because a spindle jams, a failure signal will be generated.

It may happen, however, that the stepping motor only swings through the commanded new position, whereby the angle sensor provides, for a short time, the signal corresponding to the commanded position, but that the stepping motor leaves this position at once during this oscillation. This can be taken into account in that the evaluation circuit determines a minimum time and includes testing means which responds to whether the signal of the angle sensor associated with a given control signal is supplied by the angle sensor during said determined minimum time, and the setting of the stepping motor to the angular position given by the control signal being assumed only after this condition has been fulfilled.

The control and monitoring of the stepping motor may be carried out by means of an appropriately programmed microprocessor.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
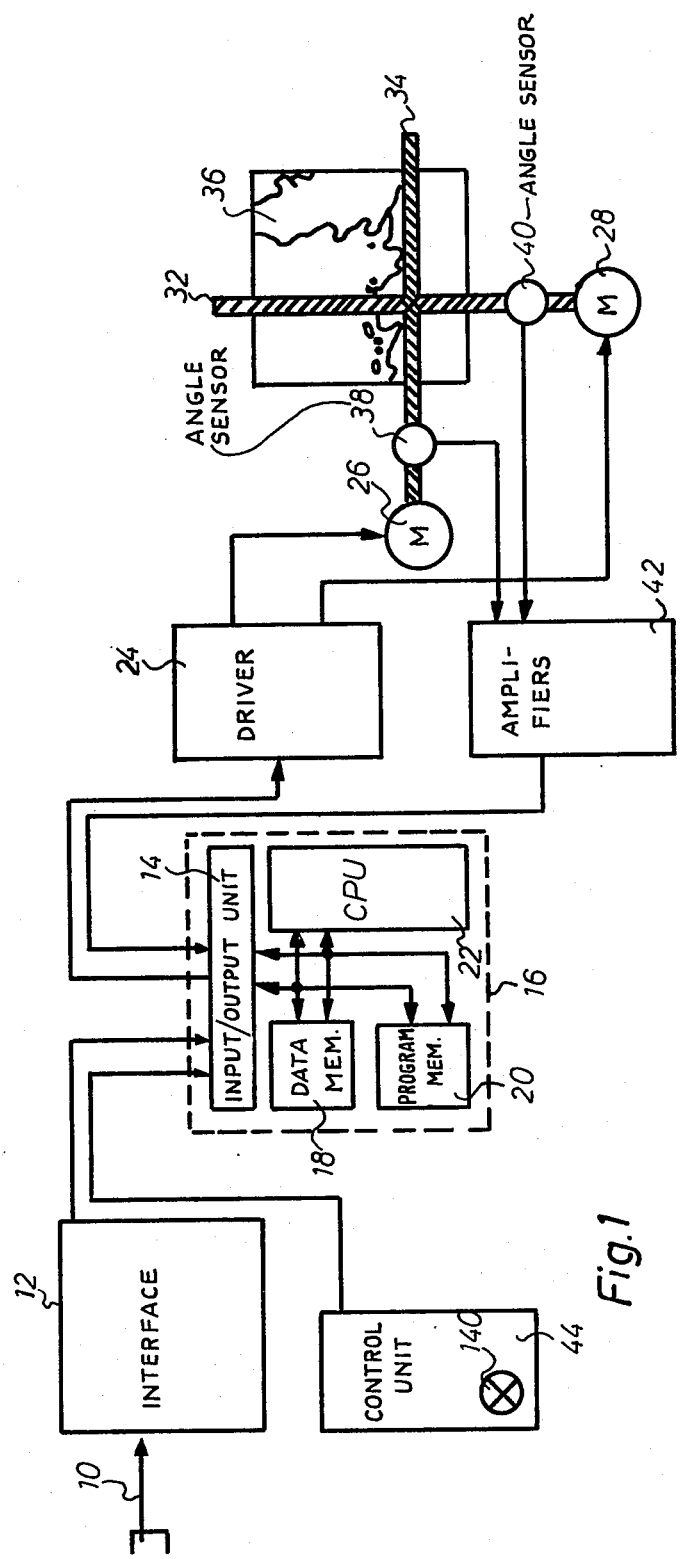
FIG. 1 is a diagrammatic illustration, as an example of use of the invention, of a map indicator unit for a navigational system comprising microprocessor and stepping motors as servomotors.

FIG. 1 illustrates schematically the construction of a map indicator unit for a navigational system as an embodiment of the stepping motor control of the invention. Coordinates are applied by a navigational computer (not shown) through an input terminal 10 to an interface 12 and are fed into the input/output unit 14 of a microprocessor 16. Conventionally the microprocessor comprises a data memory (RAM) 18, a program memory (PROM) 20 and a central processing unit (CPU) 22. The driver 24 of two stepping motors 26 and 28 is energized directly by the input/output unit 14 of the microprocessor 16. The stepping motors 16 and 28 move a light cross projector through spindles 32 and 34, respectively, the light cross projector marking a point on a map 36. Angle sensors 38, 40 are coupled to the stepping motors 26 and 28, respectively, and provide position indicating digital signals which are associated with the stable positions of the stepping motors 26 and 28. These signals are applied to the input/output unit 14 of the microprocessor 16 through amplifiers 42 and monitor, to establish whether the commanded steps have been carried out by the stepping motors 26 and 28. Numeral 44 designates a control unit through which commands can be applied to the microprocessor.

Figure 2:
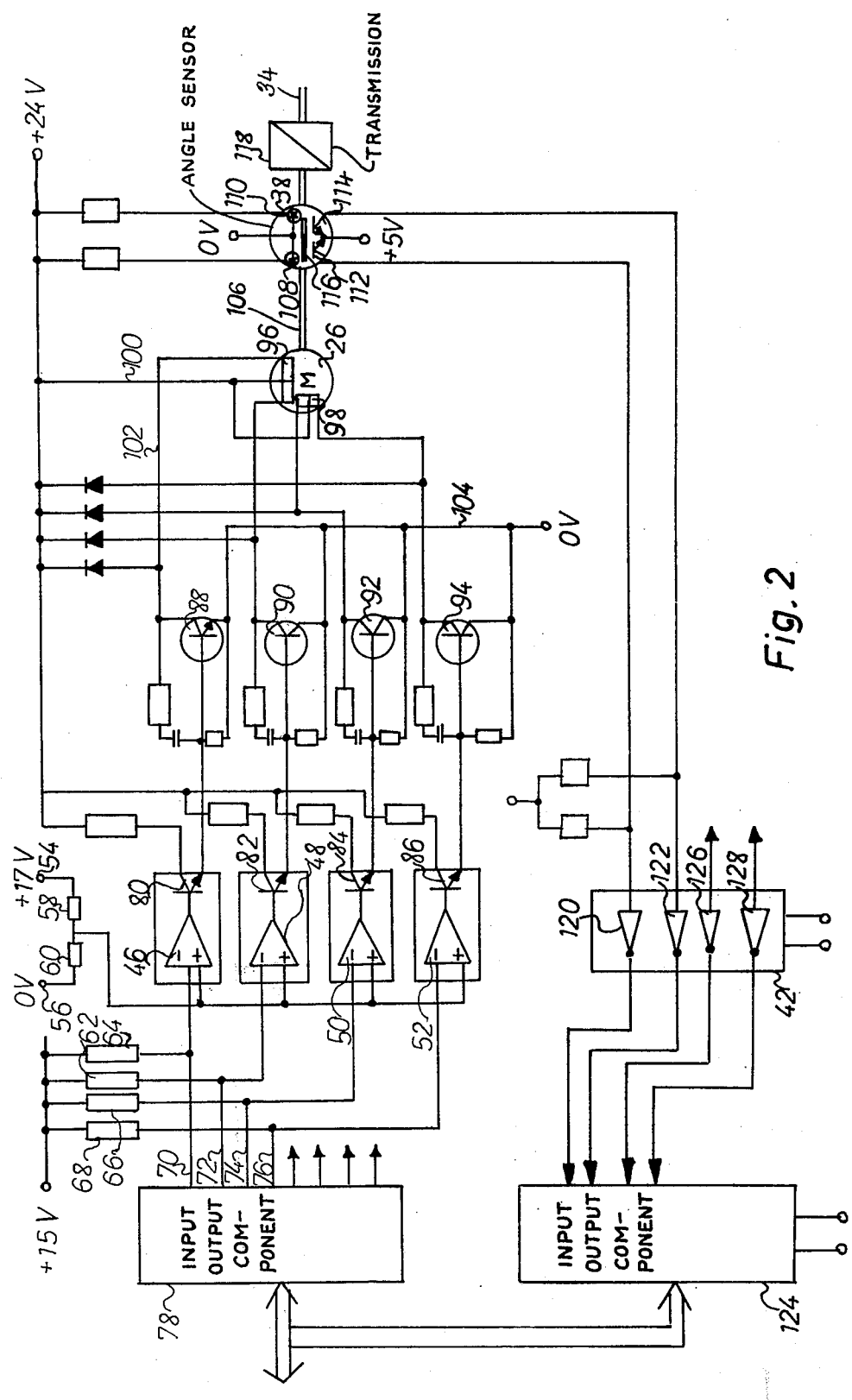
FIG. 2 is a schematic diagram of the control circuit of a stepping motor for the map indicator unit of FIG. 1.

FIG. 2 illustrates the control of one of the stepping motors 26.

Figure 4:
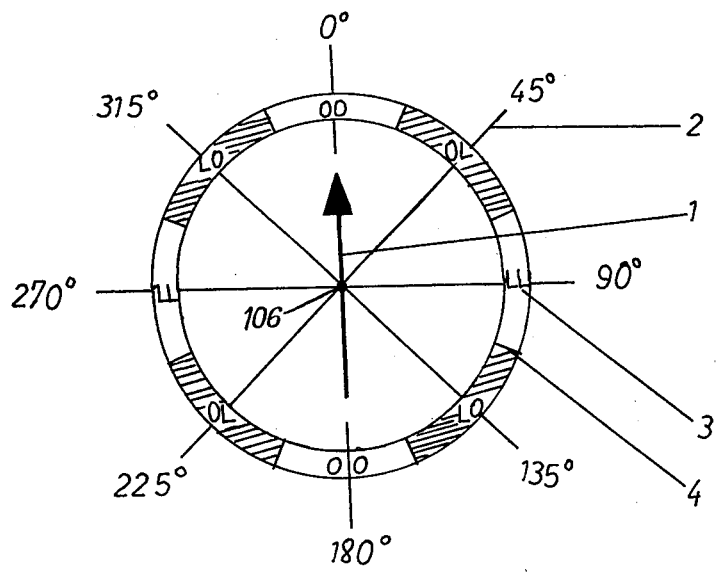
FIG. 4 illustrates the various positions of the stepping motor and the associated angle ranges of the angle sensor as well as the signals of the angle sensor associated with the angle ranges.

The driver 24 for the control of the stepping motor comprises four comparators 46, 48, 50, 52. A reference voltage is applied to the non-inverting (+) inputs of said comparators. The reference voltage is derived through voltage divider resistors 58, 60 from a supply voltage applied across terminals 54, 56. Both a supply voltage of 5 volts from resistors 62, 64, 66, 68 and the outputs 70, 72, 74, 76 of an input/output component 78 are applied to the inverting (−) input terminals of the comparators 46 to 52. The input/output component 78 provides a digital control signal by which the inverting input of each comparator 46 to 52 is either lifted to the 5 volts potential of the supply voltage or connected to ground. Correspondingly the comparator 46, 48, 50 and 52, respectively, is switched into one or the other state. The comparators 46, 48, 50, 52 render transistors 80, 82, 84 and 86, respectively, conductive or non-conductive. Transistors 88, 90, 92 and 94 are, in turn, rendered conductive or non-conductive by the transistors 80 to 86. Thereby the two windings 96 and 98 of the stepping motor 26 are energized with an energization pattern depending on the signal at the output terminals 70 to 76. If, for example, the transistor 88 is rendered conductive, a current will flow from the supply voltage of 24 volts through conductor 100 connected to a center tap of winding 96, through the right half in FIG. 2 of winding 96, conductor 102, transistor 88 and conductor 104 to ground. In this way, the stepping motor has eight stable positions which are angularly offset by 45° relative to each other. In FIG. 4 the shaft of the stepping motor 26 is designated by 106. The stable positions are located at 0°, 45°, 90°, 135°, 180°, 225°, 270° and 315°.

The angle sensor 38 is coupled with the stepping motor 26. The angle sensor 38 has a pair of light emitting diodes 108 and 110 which form two light barriers together with a pair of phototransistors 112 and 114, respectively. The light barriers are covered or uncovered depending on the position of the stepping motor, as has been indicated by the light stop 116 in FIG. 2. The light stop may be a disc rotatable with the motor and having two concentric circular arrays of opaque or transparent areas along its periphery. Each such area extends through an angle of 45° symmetrical to an associated one of the stable positions of the stepping motor. One light barrier, for example that comprising light emitting diode 108 and phototransistor 112, is located on opposite sides of the outer array, while the other light barrier is located with light emitting diode 110 and phototransistor 114 on opposite sides of the inner array. Depending on whether the light barriers are covered or uncovered they provide signals O or L, whereby the two light barriers together provide a two-digit output signal in each angle range. As shown in FIG. 4, the angle sensor 38 provides different two-digit digital position indicating signals in eight different angle ranges, namely, OO, OL, LL and LO. Each digital signal appears in an angle range or sector of 45° which is symmetrical to a respective one of the stable positions of the stepping motor 26. The digital signal OO appears within the angle ranges which are symmetrical about the 0°-position and about the 180°-position of the stepping motor. The signal OL appears within the angle ranges which are symmetrical to the 45°-position and to the 225°-position of the stepping motor. The signal LL appears within the angle ranges which are symmetrical about the 90°-position and about the 270°-position of the stepping motor, and the signal LO appears in the angle ranges which are symmetrical to the 135°-position and to the 315°-position of the stepping motor.

The stepping motor 26 drives the spindle 34 through a transmission 118.

The output signals from the phototransistors 112 and 114 are applied through inverters 120 and 122 to an input/output component 124 the output of which is connected to the bus of the microprocessor 16. The signal from the angle sensors are applied correspondingly through inverters 126 and 128.

Figure 3:
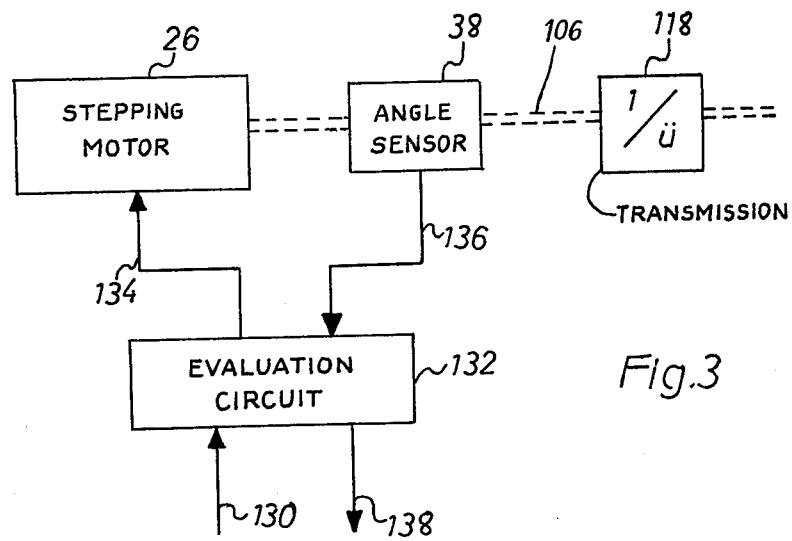
FIG. 3 is a block diagram of the monitored control of the stepping motor with angle sensor and evaluation circuit.

FIG. 3 illustrates schematically the control and monitoring of the stepping motor 26. A control command appears at an input terminal 130, which may, for example, be identical with input 10 of FIG. 1. An evaluation circuit 132, which may be the appropriately programmed microprocessor 16, provides a control signal at an output 134, which may be the output 70 to 76 of the input/output component 78. The stepping motor 26 carries out a step corresponding to the control signal. The carrying out of each such step is monitored by the angle sensor 38 which provides the position of the stepping motor 26 as digital signal at an output 136. The circuit 132 compares the step commanded by the signal at the output 134 with the rotary movement of the stepping motor 26 detected by the angle sensor 38 and provides a failure alarm at an output 138 which, for example, causes a signal lamp 140 on the control unit 44 to light up, when the commanded step has not been carried out. If the stepping motor has not carried out a commanded step, this can be due to the fact that, for example, the spindle 34 jams. However, also a natural oscillation may be excited so that the stepping motor approaches the commanded position with a transient oscillation, as shown in FIG. 5.

Figure 5:
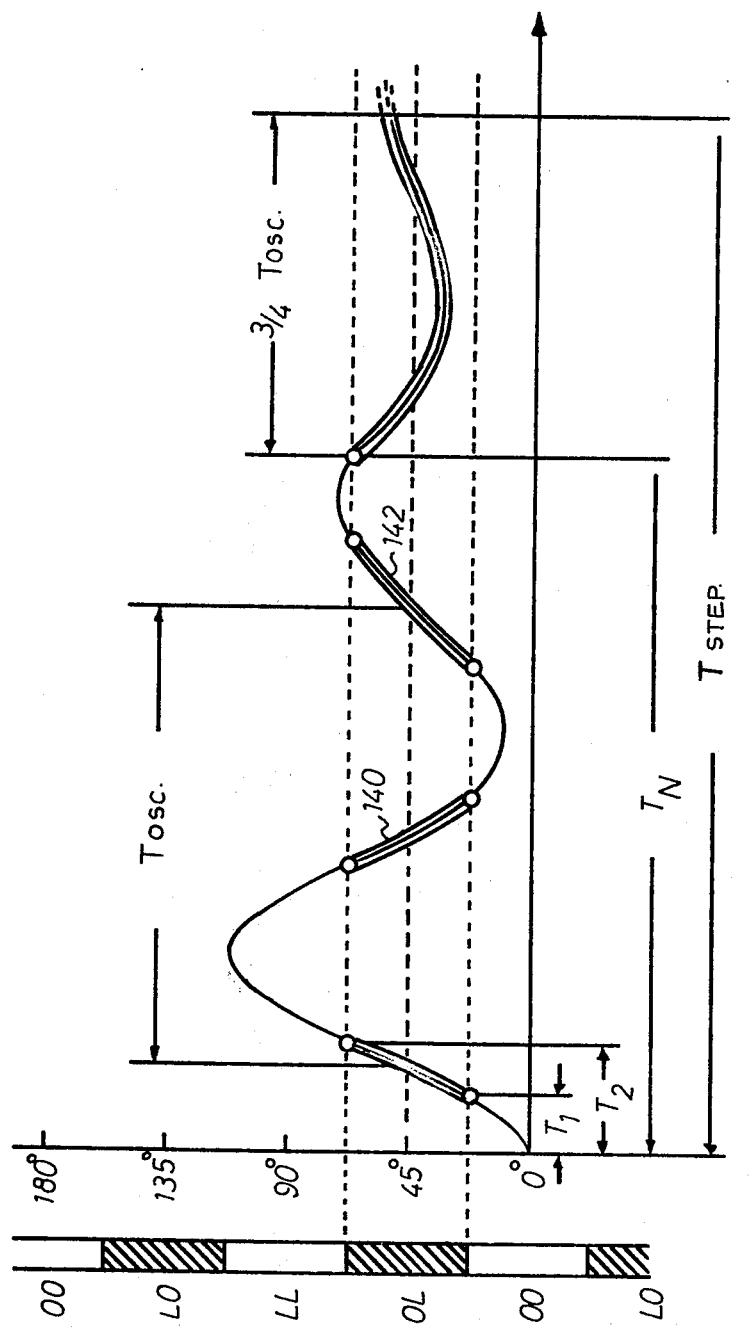
FIG. 5 illustrates a transient oscillation of the stepping motor and the associated angle sensor signals.

FIG. 5 illustrates how the stepping motor moves from the 0°-position to the 45°-position with a damped oscillation. The signal OL of the angle sensor 38 would correspond to the control signal applied to the stepping motor. This signal is reached after a rather short time $T_1$. The angle range about the 45°-position is, however, left again at the time $T_2$. The stepping motor overshoots into the range about the 90°-position. Then the stepping motor swings several times through the 45°-angle range, as shown at 140 and 142. Only after a time $T_N$ will the oscillation be completely within the angle range about the 45°-position, so that the angle sensor 38 then provides a constant output signal OL. The period of oscillation of the mechanical oscillations is designated $T_{osc}$. As a criterion of the movement of the stepping motor into the commanded position the requirement can be made for the stepping motor to remain within the 45° angle range about the commanded position during a time interval of $\frac{3}{4} T_{osc}$. Within this time interval there is at least one maximum and one minimum of the oscillation.

Figure 6:
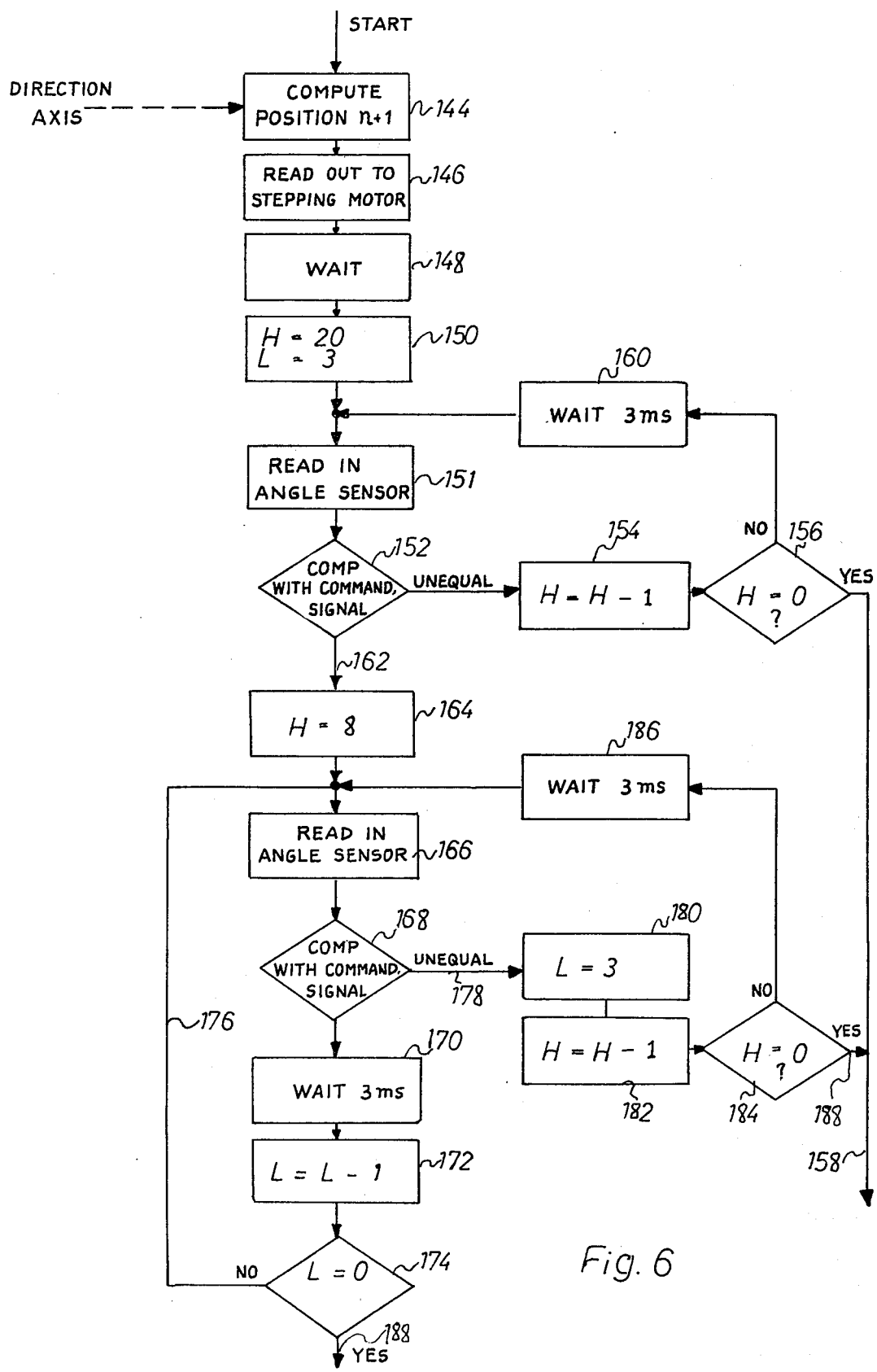
FIG. 6 illustrates the program of the microprocessor for the control of the stepping motor and the evaluation of the angle sensor signals.

The microprocessor 16 may carry out the program illustrated in FIG. 6 to control and monitor each stepping motor. Initially, the adjacent position of the stepping motor, into which the stepping motor is to be advanced, is computed from the present position of the stepping motor 26 and from the selected direction of rotation. This is illustrated by box 144. In accordance with this computation a control signal is applied to the stepping motor as illustrated by box 146. As shown by box 148, this is followed by a predetermined waiting time by which the speed of the stepping motor is determined. Following this waiting time two counters H and L are set. This is indicated by box 150. These two counters determine how often a first and a second or a third program loop will be run through.

In the first program loop, the output signal of the angle sensor 38 is read in, as illustrated by box 151. Then the read-in signal is compared to the commanded signal, which corresponds to the commanded position of the stepping motor. This is illustrated by rhombus 152. When the signal of the angle sensor 38 is unequal to the commanded signal, the reading will be reduced by one, as illustrated by box 154. Subsequently it will be tested, whether there is a counter reading of H=0, as illustrated by rhombus 156. If this is the case, a failure will be signaled at an output 158. If this is not the case, a waiting time, symbolized by box 160, will be inserted, and subsequently the loop beginning with the reading-in of the signal from the angle sensor 138 will be repeated.

Thus this first loop tests whether the stepping motor has adopted the commanded new position after the loop has been run through not more than twenty times. If this is not the case, there is a failure of the stepping motor or blocking of the drive mechanism. Also, a stop at the end of the setting range blocks the stepping motor and causes a failure signal at the output 158. This failure signal can be used to switch the stepping motor off, whereby damage of the stepping motor can be avoided.

When during the twenty runs of the first loop the comparison between the signal read-in of the angle sensor and the commanded signal detects identity, the further processing is transferred to the second loop, as indicated by arrow 162. The counter is set to H=8, as indicated by box 164. Again, the signal from the angle sensor 38 is read in, as indicated by box 166. In a comparison procedure, illustrated by the rhombus 168, this read-in angle sensor signal is compared to the commanded signal which results from the commanded step of the stepping motor 26. If these signals are equal, a waiting time of 3 milliseconds becomes effective, which is illustrated by box 170. After this waiting time has elapsed, the counter reading L is reduced by one, symbolized by box 172, and it is tested, whether L has become zero. This is illustrated by rhombus 174. If this is not the case, at first, (in the beginning L=3), the process described is repeated, as illustrated by the connection 176. If this results again in inequality of the angle sensor signal and the commanded signal, the third loop will be pursued, as illustrated by the arrow 178. The counter is again set to L=3, which is illustrated by the box 180. Subsequently the counter reading H is reduced by one. This is symbolized by the box 182. It is tested, illustrated by rhombus 184, whether H has become zero after this reduction. If this is not the case, the comparison of angle sensor signal and commanded signal is repeated after a waiting time of 3 milliseconds, symbolized by the box 186. If the counter reading becomes H=0 after the reduction of H by one in accordance with box 182, this will also cause a failure signal, as illustrated by arrow 188.

In the operation shown in FIG. 5, where the stepping motor oscillated, the comparison of equality of angle sensor signal and commanded signal symbolized by the rhombus 152 would indicate identity before the first loop has been run through twenty times. Thereby the second loop would become effective. The second loop would, however, upon repeated comparison symbolized by the rhombus 168, again signal inequality of angle sensor signal and commanded signal before the second loop has been run through three times, i.e., before L has become L=0. In this case the counter reading would be reset to L=3 (box 180) and the third loop would be run through. In accordance with FIG. 5 equality and subsequently inequality of angle sensor signal and commanded signal would be detected and each time the processing would be switched again to the third loop. With the third trial, however, the stepping motor remains within the angle range formed about the 45°-position, in accordance with FIG. 5. Thus the angle sensor signal remains at its commanded value OL. Thus the second loop would be run through three times without switching over to the third loop, whereby L is counted down to 0 and, as illustrated by the arrow 188, a signal is generated which confirms the execution of the commanded step. If after eight trials still no stationary angle sensor signal corresponding to the commanded value appears, a basic error would have to be assumed and, correspondingly, a failure signal would have to be generated.

The direct coupling of stepping motor and angle sensor permits permanent monitoring of the stepping motor. As the angle sensor needs to have only low angular resolution, it can be of simple construction and relatively inexpensive. The microprocessor which is used here also can be utilized for other computations so that no additional circuit components are required. The evaluation takes the dynamic phenomena with the execution of the steps into consideration. The step frequency is automatically brought in conformity with the mechanical conditions so that resonances can no longer occur. A resonance phenomenon of the type illustrated in FIG. 5 would result in a delay of the next step and thus in a reduction of the step frequency. This, in turn, would get the stepping motor away from resonance. A smaller stepping motor can be used for a given application than with the prior art instruments. The evaluation circuit also recognizes a stop as blocking and can cause the stepping motor to be switched off by means of the failure signal.

Instead of an opto-electronic angle sensor, other angle sensors such as contacts or magnetic field responsive elements may be used. The angle sensor may be combined with the stepping motor in one integral component. Instead of a microprocessor, permanently wired electronic circuit may be provided.

The usefulness of the monitored control of a stepping motor as described is not limited to map indicator units of the type described.

I claim:

1. In a device for the monitored control of a stepping motor, comprising a control device for generating a plurality of digital control signals for the stepping motor, each digital signal being associated with one or more discrete, non-adjacent, stable positions of the stepping motor and generating an energization pattern of the stepping motor windings corresponding to this position, and angle sensor means coupled with the stepping motor for generating feedback signals, said angle sensor means producing a single well-defined position indicating signal for each stable position of the stepping motor, which position indicating signal for each such position is different than the signals for each other position adjacent thereto, the improvement comprising:

an evaluation means, connected to receive said control signals and said position indicating signals, for comparing said signals and producing an error signal when correspondence does not occur, said evaluation means producing said error signal when, after a predetermined maximum time after a control signal has been applied, the position indicating signal does not then correspond to the control signal, said evaluation means determining a minimum time after a control signal has been established and including testing means which responds to whether the position indicating signal associated with that control signal is received throughout said determined minimum time, the setting of the stepping motor to the angular position given by the control signal being assumed only after this condition has been fulfilled.

2. In a device as set forth in claim 1, wherein the evaluation means also produces an error signal when, during said minimum time correspondence occurs between the control signal and the position indicating signal followed by a state of dissimilarity between the control signal and the position indicating signal, said state of dissimilarity then continues for a given maximum time.

3. In a device for the monitored control of a stepping motor, comprising a control device for generating a plurality of digital control signals for the stepping motor, each digital signal being associated with one or more discrete, non-adjacent, stable positions of the stepping motor, and generating an energization pattern of the stepping motor windings corresponding to the respective position, and angle sensor means coupled with the stepping motor for generating feedback signals, said angle sensor means producing a single well-defined digital position indicating signal for each stable position of the stepping motor, which position indicating signal for each such position is different than the signals for each other position adjacent thereto, whereby when a command digital control signal is established the stepping motor will be commanded to move to a specific stable position and if the motor does not move to that specific position the angle sensor means fails to generate a single well-defined digital position indicating signal corresponding to said specific stable position, the improvement comprising:

an evaluation circuit connected to receive said command digital control signal and said digital positioning indicating signal, said evaluation circuit including means for sequentially comparing said two signals at discrete intervals a given maximum number of times and for producing an error signal when identity of the two compared signals does not exist by the time of the last of said sequential comparisons.

4. In an apparatus as set forth in claim 2, wherein said evaluation circuit includes another means for sequentially comparing at discrete intervals said command digital control signal and said digital position indicating signal and for producing an output signal, indicative of the stepping motor having moved to the commanded position, only upon the occurrence of a predetermined minimum number of instances of identity of the compared signals.

5. In an apparatus as set forth in claim 4, wherein said another means is connected to the first mentioned sequentially comparing means to be activated to compare said command digital control signal and said digital position indicating signal only after said first mentioned sequentially comparing means has identified an instance of identity of the two signals compared thereby.

6. In an apparatus as set forth in claim 5, wherein said another means, after it is so activated and thereafter identifies an instance of lack of identity between the two signals compared thereby, produces an error signal when identity of the two compared signals does not occur by the time of the last of a predetermined maximum number of said sequential comparisons.

7. In an apparatus as set forth in claim 6, wherein said predetermined maximum number is substantially less than said given maximum number.

8. In a device for the monitored control of a stepping motor, comprising a control device for generating a plurality of digital control signals for the stepping motor, each digital signal being associated with one or more discrete, non-adjacent, stable positions of the stepping motor and generating an energization pattern of the stepping motor windings corresponding to the respective position, and angle sensor means coupled with the stepping motor for generating feedback signals, said angle sensor means producing a single well-defined, digital position indicating signal for each stable position of the stepping motor, which position indicating signal for each such position is different than the signals for each other position adjacent thereto, whereby when a command digital control signal is established the stepping motor will be commanded to move to a specific stable position and if the motor does not move to that specific position the angle sensor means fails to generate a single well-defined digital position indicating signal corresponding to said specific stable position, the improvement comprising:

an evaluation circuit connected to receive said command digital control signal and said digital positioning indicating signal, said evaluation circuit including means for sequentially comparing at discrete intervals said command digital control signal and said digital position indicating signal and for producing an output signal, indicative of the stepping motor having moved to the commanded position, only upon the occurrence of a predetermined minimum number of instances of identity of the compared signals.

* * * * *